June 23, 1970    O. A. KRAUER ET AL    3,516,518

ELEVATOR CONTROL SYSTEM

Original Filed Oct. 13, 1965      4 Sheets-Sheet 1

INVENTORS
OTTO ALBERT KRAUER
KENNETH RAYMOND BROOKS
SIDNEY HOWARD BENJAMIN

BY _____ ATTORNEY

INVENTORS
OTTO ALBERT KRAUER
KENNETH RAYMOND BROOKS
SIDNEY HOWARD BENJAMIN
BY R. T. Mayer ATTORNEY June 23, 1970 — O. A. KRAUER ET AL — 3,516,518
ELEVATOR CONTROL SYSTEM
Original Filed Oct. 13, 1965 — 4 Sheets-Sheet 3

INVENTORS
OTTO ALBERT KRAUER
KENNETH RAYMOND BROOKS
SIDNEY HOWARD BENJAMIN
BY C. T. Mayer ATTORNEY United States Patent Office 3,516,518
Patented June 23, 1970

3,516,518
ELEVATOR CONTROL SYSTEM
Otto Albert Krauer, Tuckahoe, and Kenneth Raymond Brooks and Sidney Howard Benjamin, Brooklyn, N.Y., assignors to Otis Elevator Company, New York, N.Y., a corporation of New Jersey
Original application Oct. 13, 1965, Ser. No. 495,585, now Patent No. 3,442,352, dated May 6, 1969. Divided and this application June 27, 1968, Ser. No. 740,667
Int. Cl. B66b 1/28
U.S. Cl. 187—29                           18 Claims

ABSTRACT OF THE DISCLOSURE

A control system for an elevator car in which the acceleration is controlled by a signal which varies as a continuous function of time and the deceleration is controlled primarily by a signal which varies as a continuous function of the distance the car is from a landing which has been selected as the one at which the car is to stop. A signal to stop at a selected landing is generated in response to the existence of a predetermined relationship between a signal proportional to the actual speed of the car and the signal which varies as a continuous function of the distance from the selected landing. After a signal to stop has been generated control of the car is switched from the time varying signal to the distance varying one in response to the magnitudes of said signals attaining substantial equality.

---

This is a division of the co-pending application of Otto Albert Krauer et al., Ser. No. 495,585, filed Oct. 13, 1965, now U.S. Pat. No. 3,442,352 entitled "Elevator Control System" and assigned to the assignee of this application.

This is an invention in the art of elevator control. In its broadest aspects it relates to elevator control systems in general. Specifically, it is concerned with controlling hoisting motors in high speed passenger elevator systems and while those skilled in the art will realize that it is not limited to such applications, for convenience, it will be described as applied to such a system.

In elevator systems in which hoisting motors drive traction sheaves to raise and lower the cars, the velocity at which the cars ascend and descend is controlled by controlling the operation of the hoisting motors. In some of these systems, especially those in which the cars transport passengers at high speeds, it is desirable that the hoisting motors be controlled in a manner which accelerates the cars from rest to a maximum running speed and decelerates them from that speed to a stop in a minimum period of time. It is important, however, that this control be exercised without discomforting the passengers. As a result, it is essential that those factors which can cause discomfort, the acceleration, the deceleration, and the jerk, i.e. the rate of change of acceleration and deceleration, be limited in magnitude. In some known systems this has been accomplished by confining changes in the speed of the elevator hoisting motor to discrete steps calculated to prevent excessive jerk and excessive rates of change of speed. High speed elevators, however, require a large number of such steps and for each of these steps it is likely that an adjustment is necessary at the installation site.

It is an object of this invention to control the operation of an elevator hoisting motor in such an improved manner that variations which are introduced in the speed of the motor, take place in a continuous stepless fashion. As a result, the discrete changes in motor speed which have been perceptible to the passengers riding in elevator cars of prior systems are eliminated, and a further object of the invention, to improve the comfort of passengers, is achieved.

It is a still further object of this invention to provide an elevator motor control system in which the majority of adjustments can be made during manufacture so that the adjustments at the installation site are reduced to a minimum.

A preferred embodiment of the invention features a high performance closed loop system which operates an elevator hoisting motor in accordance with control signals it receives from speed dictating equipment. Means are provided in the system to provide feedback signals which are combined with the control signals received from the speed dictating equipment to insure that the motor accurately follows the control signals and that the system operates in a stabilized manner.

Figure 1:
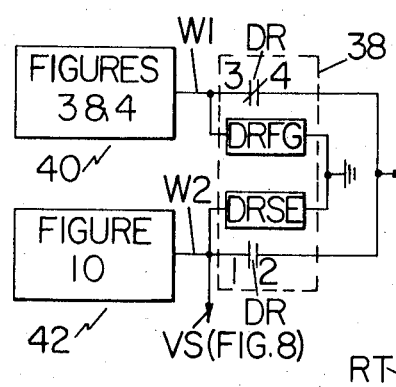
FIG. 1 is a schematic representation of an elevator control system embodying the invention.

The accompanying drawing will now be described so as to identify the equipment schematically represented therein and to relate that equipment to the reference characters by which it is designated.

In FIG. 1 the rotating element or armature 10 of a direct current elevator hoisting motor is schematically illustrated. Mounted on the shaft of armature 10 for rotation thereby, is a traction sheave TS for the hoist ropes 11 of an elevator car CA and its counterweight CW. An electromechanical brake BR is provided to be applied to a brake drum mounted on the shaft of armature 10 in any satisfactory well known manner. Main field 14 of the elevator hoisting motor is connected across a constant potential source schematically represented by battery 15. In accordance with the well known Ward Leonard principles of variable voltage control, motor armature 10 is connected across the output of a direct current generator whose armature 16 is mounted on the same shaft as rotor 18 of an alternating current drive motor, not otherwise shown. Main field 20 of the direct current generator is connected in series with resistor RDG between the center tap of the secondary of transformer 23 and the output circuit from the silicon controlled rectifiers of reversible single phase full wave rectifying circuit 22. The input connections to circuit 22 are across the secondary of transformer 23 by way of lines S1 and S2. The primary of transformer 23 is connected across a source of single phase 60 cycle alternating current indicated by lines O1 and O2. This same source is also connected to the input circuit of control device 24, which may suitably take the form of a magnetic amplifier. The output circuit of device 24 is connected to the gates of the silicon controlled rectifiers of circuit 22 to transmit firing pulses to these gates under conditions to be more fully explained later. Another input circuit to device 24 is provided from driving amplifier 26. Connected to the input of driving amplifier 26 is summation network 28, which may suitably include a static element operational amplifier. Of the two input circuits to network 28, one is connected in a degenerative feedback arrangement from generator field 20 and the other is coupled to summation network 30 through an R.C. stabilizing phase lag network 32 which symbolizes various passive networks those skilled in the art employ as suitable in different applications. Summation network 30, which also may suitably include a static element operational amplifier, is arranged with three input circuits. The first of these is connected to equipment mentioned below, the second to the output circuit of a tachometer generator 34 mounted on the shaft of motor armature 10, and the third to a feedback network 36 connected to the circuit of motor armature 10.

Figure 2:
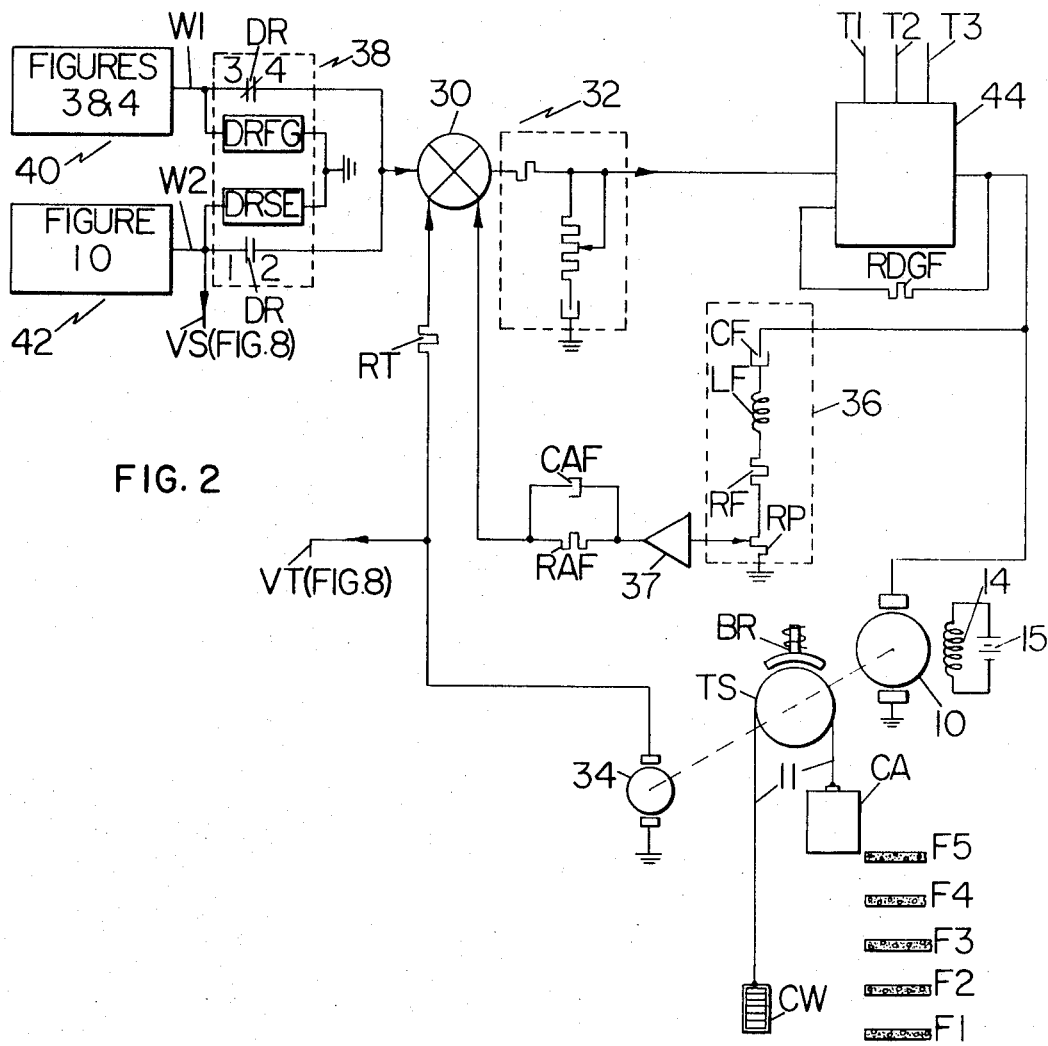
FIG. 2 is a schematic representation of an alternative elevator control system embodying the invention.
Figure 3:
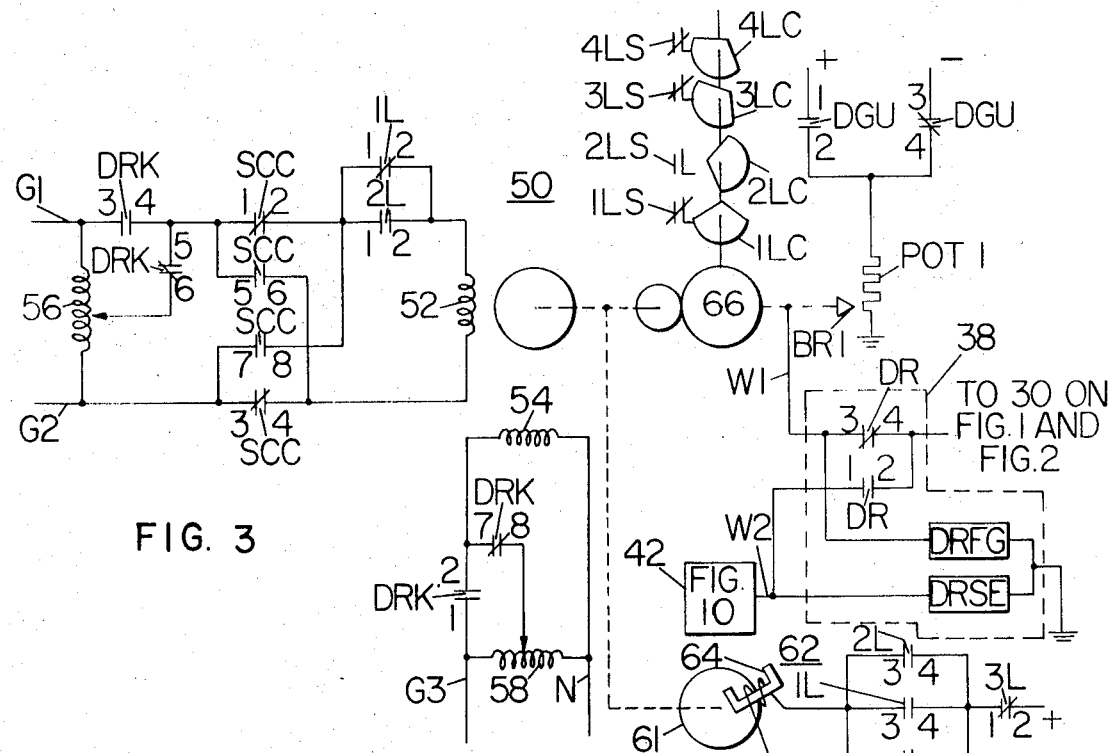
FIG. 3 is a more detailed schematic representation of a part of the control systems shown in FIGS. 1 and 2.
Figure 4:
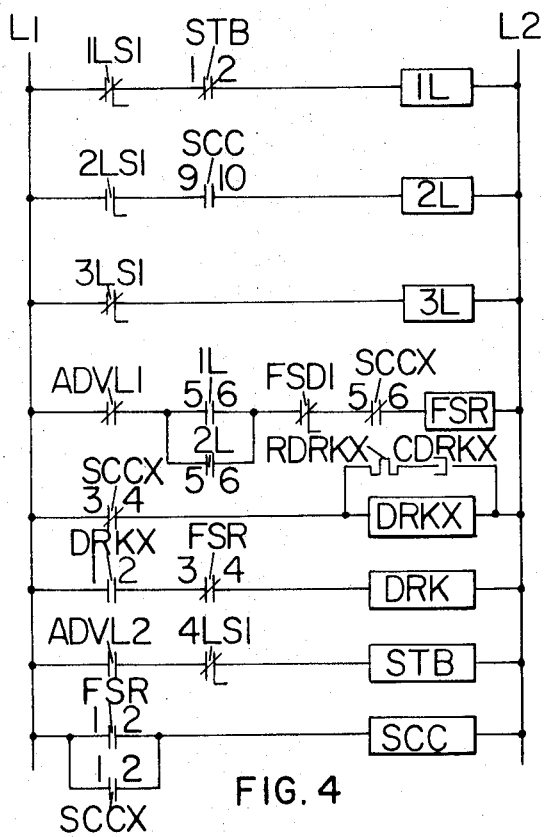
FIG. 4 is a simplified schematic wiring diagram in across the line form of the coils of some of the switches whose contacts are shown in FIG. 3.

The equipment connected to the first input circuit of network 30 includes comparator-switch 38, function generator 40 and selector machine 42. Equipment suitable to implement selector machine 42 is fully disclosed subsequently. Comparator-switch 38 includes a differential relay having two coils DRFG and DRSE, making contacts DR1-2 and breaking contacts DR3-4. Function generator 40, shown in more detail in FIGS. 3 and 4, comprises two phase motor 50 having control winding 52 and reference winding 54 typically connected across a three phase supply of alternating current indicated by lines G1, G2, G3 and neutral N. Variable voltage transformers 56 and 58 are connected through contacts of delay reversing switch DRK across control winding 52 and reference winding 54 to permit different voltages to be applied across the windings in response to the operation of switch DRK. Connected directly to the shaft of motor 50 for rotation thereby is disc 60 of eddy current brake device 62 comprising said disc and solenoid 64. Through gear box 66 there is also connected to the shaft of motor 50, sliding contact BR1 of linear potentiometer POT1 and cams 1LC, 2LC, 3LC and 4LC which operate associated limit switches 1LS, 2LS, 3LS and 4LS. One end of potentiometer POT1 is connected to ground whereas the other end is connected through contacts of direction reversing switch DGU to a source of positive and negative potential. Various other circuits for the coils of electromagnetic switches are shown in FIG. 4. These switches enable the desired operation of motor 50 and their operation will be explained in greater detail later. They are designated as follows:

DRK—Delay Reversing Switch
DRKX—Auxiliary Delay Reversing Switch
FSR—Floor Stop Relay
1L—First Limit Switch Relay
2L—Second Limit Switch Relay
3L—Third Limit Switch Relay
SCC—Stop Control Switch
STB—Dictation Start Switch In FIG. 2 an arrangement similar to that of FIG. 1 is shown. In this arrangement the Ward Leonard Control equipment of FIG. 1 has been replaced by static element adjustable voltage power converting equipment 44. Resistor RDGF provides a degenerative feedback arrangement for this equipment which may suitably include a three phase full wave silicon controlled rectifier reversible bridge circuit arranged to provide a reversible polarity, adjustable magnitude direct current output from a three phase alternating current supply indicated by lines T1, T2, T3. Subject to the counter EMF of armature 10, the magnitude and polarity of this output current are determined by the sequence and the phase relationship by and at which the silicon controlled rectifiers are fired and the period of each cycle of each phase of the alternating current supply during which the silicon controlled rectifiers conduct. These factors, in turn, are determined by the magnitude and polarity of the output signal from summation network 30. Equipment satisfying these operating requirements can be purchased from the General Electric Company and may include the regulator amplifier, the gate pulse generator and amplifier, and the silicon controlled rectifier bridge circuit of the power conversion equipment sold by that company under the trade name "SILCOMATIC."

Figure 8:
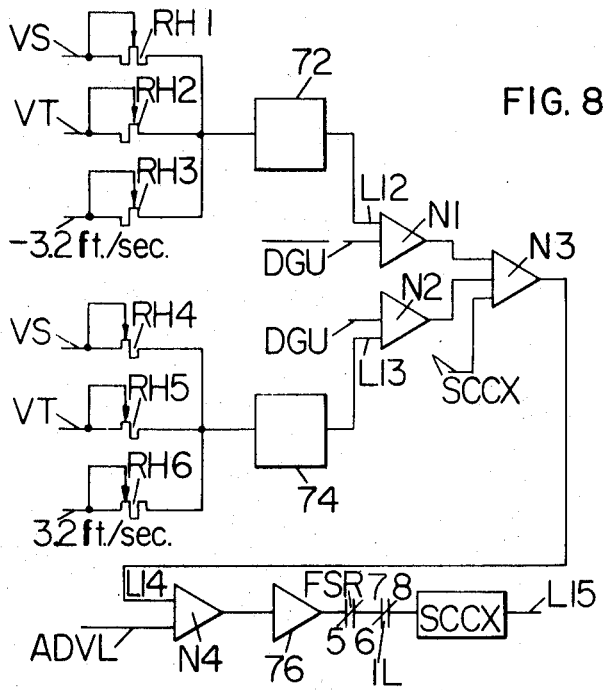
FIG. 8 is a simplified schematic circuit diagram of equipment employed by the elevator control systems shown in FIGS. 1 and 2.

FIG. 8 shows computing circuitry including input circuits $V_S$ and $V_T$ carrying signals from selector machine 42 and tachometer generator 34, respectively. These, together with circuits carrying constant signals, are connected to up and down direction differential amplifiers 72 and 74 whose outputs are connected to various "NOR" elements N1, N2, N3 and N4. The output circuit from these "NOR" elements is connected to relay driver amplifier 76 which is used to operate auxiliary stop control switch SCCX through the energization of its coil.

Figure 10:
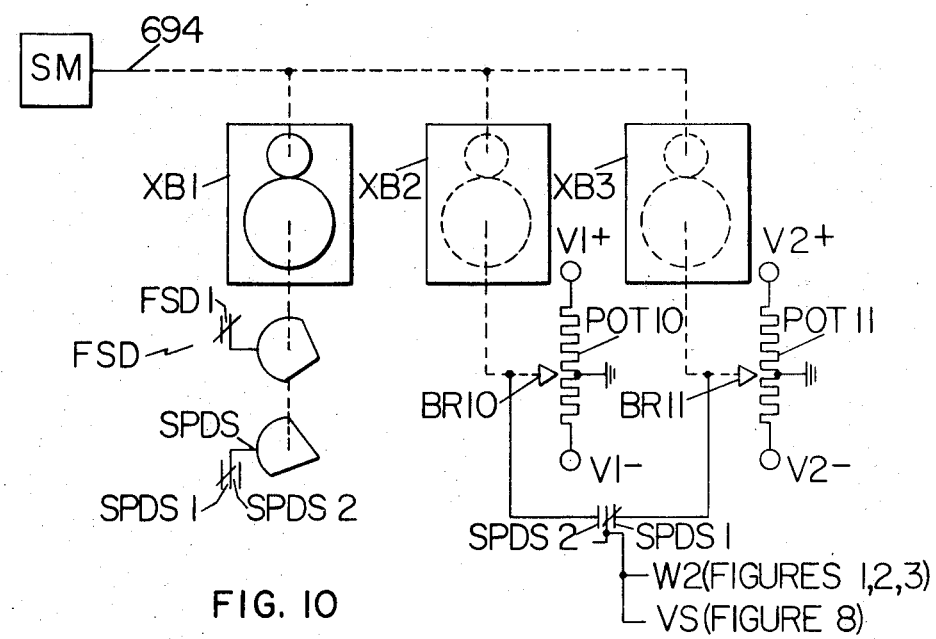
FIG. 10 is a more detailed schematic representation of a selector machine used in the contorl systems shown in FIGS. 1 and 2.

FIG. 10 shows a schematic representation of a well known selector machine designated SM from which extends a shaft 694. Connected to this shaft are a plurality of gear boxes XB1, XB2 and XB3. Switches FSD and SPDS are connected to shaft 694 through gear box XB1 and sliding contacts BR10 and BR11 of potentiometers POT10 and POT11 are connected to shaft 694 through gear boxes XB2 and XB3, respectively. The center of each potentiometer POT10 and POT11 is grounded. Their ends are connected to positive and negative voltage supplies marked V1+ and V1− for potentiometer POT10 and V2+ and V2− for potentiometer POT11.

Figure 11:
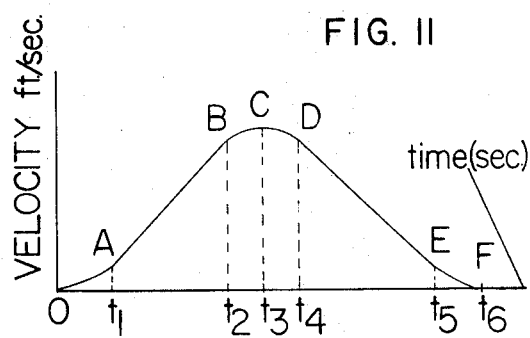
FIG. 11 is a graph on which time is represened by the abscissa and velocity by the ordinate.

FIGS. 5, 6, 7, 9 and 11 show various graphs which have already been identified. The curves on these graphs will now be described in general but it should be understood that their full significance will appear hereinafter. It should be noted, at this point, that some of the graphs have only voltage ordinates while others have both velocity and voltage ordinates. A scale is shown on FIGS. 7 and 9 for each of the ordinates representing velocity to aid in understanding the specific operation which is described. No voltage scale is shown on the graphs having voltage ordinates since such a scale is peculiarly a matter of choice and design in relation to the specific equipment used for particular elements of the control system. Two of the graphs have distance abscissas. Each of these is scaled for the same reason that the foregoing velocity ordinates are scaled. The abscissas of the other three graphs are time. These, as well as, the velocity ordinate of FIG. 11, are not scaled since the durations of the functions shown by the curves on these graphs depend upon the length of particular runs made by an elevator car controlled in the specific manner described. Certain points of time, however, thought helpful to understanding the described operation, are included.

Figure 5:
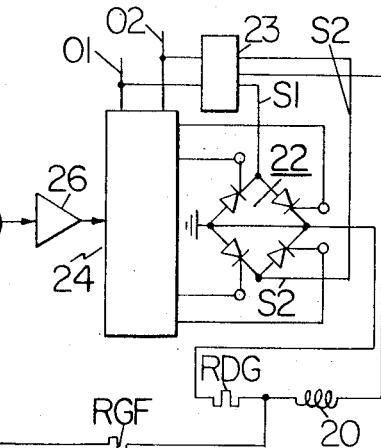
FIGS. 5 and 6 are graphs on which time is represented by the abscissa and voltage by the ordinate.
Figure 5:
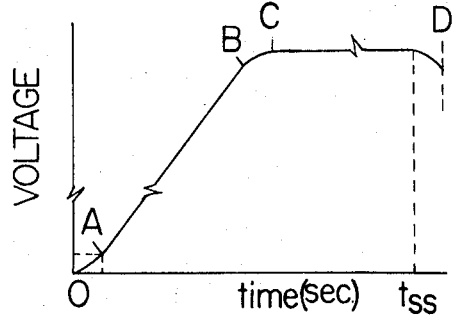

The curve shown in FIG. 5 represents an input signal, which the elevator control systems shown in FIGS. 1 and 2 are to follow so that they operate in accordance with certain speed characteristics. This signal is represented as a function of time for a portion of a full speed run of an elevator car controlled by these systems.

Figure 6:
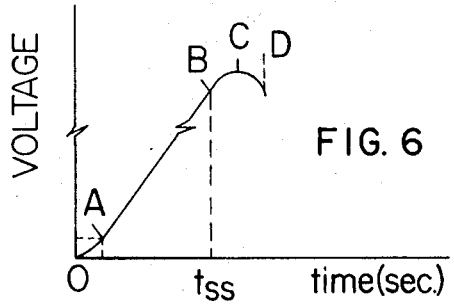

FIG. 6 shows a curve which represents a similar function of time as that on FIG. 5 except it is for a portion of a less than full speed run of an elevator car.

Figure 7:
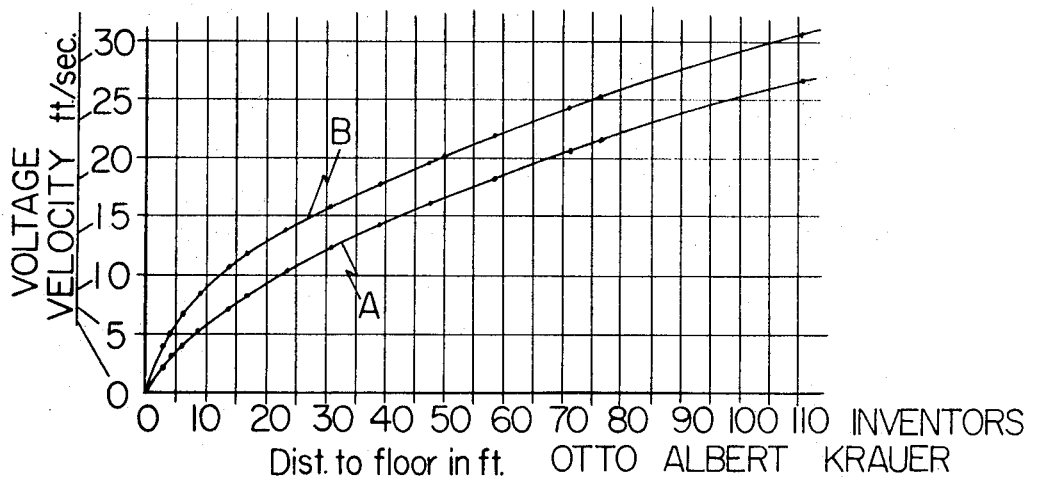
FIG. 7 is a graph on which distance is represented by the abscissa and both velocity and voltage by the ordinate.

Plotted on FIG. 7 are two curves A and B. With respect to the ordinate representing velocity, each curve represents a particular velocity as a continuous function of a car's distance from a selected floor at which it is to stop in a prescribed manner. Curve A represents the velocity at which an elevator car undergoing a constant acceleration should be traveling when it starts to decrease its acceleration upon receiving a signal to stop at the floor selected. Curve B represents the velocity at which an elevator car undergoing a certain deceleration should be traveling if it is to stop at the selected floor in the prescribed manner. With respect to the ordinate representing voltage, curve B represents the manner in which the potential of an input signal varies as a function of the distance an elevator car is from a selected floor at which it is to stop. This signal, if applied to the elevator control systems of FIGS. 1 and 2, stops the car at the selected floor in the prescribed manner.

Figure 9:
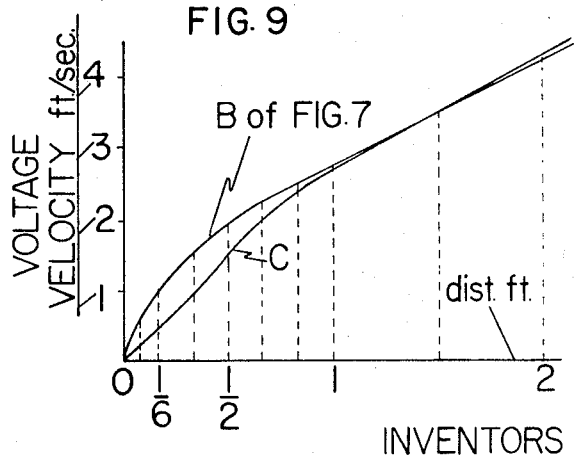
FIG. 9 is a graph on which distance is represented by the abscissa and both velocity and voltage by the ordinate.

Plotted on the graph of FIG. 9 are two curves B and C. Curve B on this graph is a portion of curve B of FIG. 7 in an enlarged scale and represents the same functions as it represents there. Curve C, with respect to the ordinate representing velocity, represents the velocity at which an elevator car should be traveling within one to two feet of a selected floor if it is to stop at the floor in a desired manner. With respect to the ordinate representing voltage, curve C represents the manner in which the potential of an input signal varies as a function of a car's distance within one to two feet of a selected floor at which it is to stop. This signal, if applied to the elevator control systems of FIGS. 1 and 2 stops the car at the selected floor in the desired manner.

The curve plotted on FIG. 11 represents velocity characteristics as a function of time during a typical run of an elevator car operated in a prescribed manner.

In order to fully appreciate the invention it is helpful to understand some practical aspects concerning the operation of high speed elevator cars. According to one prescribed method of operation, an elevator car is to be started from rest with a rate of change of acceleration of 8 ft./sec.$^3$ which is to last until an acceleration of 4 ft./sec.$^2$ is attained. The car is then to be accelerated at a constant acceleration of 4 ft./sec.$^2$ until it reaches a velocity from which a decreasing acceleration at the rate of 8 ft./sec.$^3$ brings its acceleration to zero and its velocity to its full rated value. When this full rated velocity is reached the car is to continue at that velocity until it receives a signal to stop. It is then to be slowed down a a rate of change of deceleration of 8 ft./sec.$^3$ until a deceleration of 4 ft./sec.$^2$ is attained. The car is then to decelerate at a constant deceleration at 4 ft./sec.$^2$ until it reaches a velocity from which decreasing deceleration at the rate of 8 ft./sec.$^3$ brings it to rest.

The foregoing assumes the car travels a sufficient distance to attain full rated speed before receiving a signal to stop. Under actual operating conditions a car often receives a signal to stop during the period of constant acceleration. In that case, upon the signal to stop being received the acceleration is to be decreased at the rate of 8 ft./sec.$^3$ until it is zero whereupon the car is then to be slowed down at a rate of change of deceleration of 8 ft./sec.$^3$. This is to continue until a deceleration of 4 ft./sec.$^2$ is reached. Thereupon the car is to be brought to rest in the same way it would be if it had run at full rated speed.

The foregoing method of operation is possible if the speed of the car is controlled solely as a function of time. This type of control, however, is not entirely suitable because it does not insure that the car is within an acceptable distance of a floor level when it is brought to rest. For this reason, in the system to be described, part of the decelerating operation is controlled by the distance the car is from the floor level at which it is to stop. This control is initiated when the car starts to decelerate at 4 ft./sec.$^2$ and is continued until the car comes to rest. At the time it is initiated the speed of the car is so coordinated with its distance from the floor at which it is to stop that its operaion in coming to rest is in accord with the prescribed method until it is within approximately one foot of the floor level at which it is to stop. Thereafter as will be explained, a slight but desirable variation from the prescribed method is introduced. This is done because a signal which provides the prescribed method of operation may affect the stability of the system as it brings the car closer to the floor. For this reason, the signal which is employed in the last foot of travel into a floor varies the operation slightly from that prescribed yet it brings the car into the floor rapidly and accurately regardless of the load on the car and without affecting the stability of the system. With the foregoing as background, operation of an embodiment of the invention will now be presented.

Assume the elevator system including the equipment illustrated in FIG. 1 receives, in any well known manner a signal to start to move in a selected direction of travel. As the doors close, the car is enabled to move and function generator 40, in a manner hereinafter to be described begins to generate a signal whose potential with respect to time takes the form of the curve shown in FIG. 5. (Of course, it is understood that if the car is to move in the opposite direction of travel the output signal of function generator 40 is of a form whose curve is opposite in polarity but symmetrical to that of FIG. 5.) Consider separately the effect of this generated signal has on the elevator system. Under the assumption that the car is stopped, this signal travels unaffected from function generator 40 by way of line W1 through contacts DR 3–4 of comparator-switch 38 into summation network 30. It is received by network 30 and passes through that piece of equipment to R.C. lag network 32. Summation network 28 receives an output signal from network 32 and passes it to driving amplifier 26. It is there amplified and transmitted to control device 24 where it causes gate pulses to be generated for the silicon control rectifiers of circuit 22. As these gate pulses are generated the direct current generator of the motor generator set is excited by a rectified current which starts to flow from circuit 22 through main field 20. A signal proportional to this current is fed back to network 28 through resistor $R_{GF}$ effectively to eliminate the time constant of main field 20 according to well known principles of feedback control. At the same time the excitation in the generator develops a voltage across generator armature 16 which causes a current to flow through armature 10 of the elevator hoisting motor. As a result the motor begins to run and the elevator car starts to move in the selected direction of travel.

It is to be understood that the magnitude and polarity of the amplified signal received by control device 24 in response to the output signal from network 30 determines the time at which gate pulses are generated during each cycle of the alternating current supply applied to circuit 22 between lines S1 and S2. This governs the interval of each cycle of the alternating current supply during which the silicon control rectifiers of circuit 22 conduct. In this way the output signal from network 30 regulates the magnitude and the polarity of the current flowing through main field 20 and controls the output voltage of the direct current generator and the speed of the elevator hoisting motor.

Under the assumed conditions, the output signal from network 30 is controlled by that of function generator 40 whereby a current flows in armature 10 of the hoisting motor which for reasons to be hereinafter described, starts the car with a rate of change of acceleration of 8 ft./sec.$^3$. The potential of the output signal of function generator 40 then increased to a maximum value as a function of time as shown in FIG. 5 which brings the car to its full rated speed in accordance with the prescribed method of operation.

Function generator 40 continues to generate a signal which maintains the car at full rated speed until the system receives a signal to stop. At that time, illustrated in FIG. 5 as time "$t_{ss}$," the output signal of function generator 40 starts to decrease causing the armature voltage of the direct current generator to decrease. As a result, the current in armature 10 of the hoisting motor is altered in such a way that the car starts to decelerate. As will later be more fully described this continues until an output signal from selector machine 42 becomes substantially equal in magnitude to that of function generator 40. At that time comparator-switch 38 opens contacts DR3–4 to disconnect the function generator from network 30 and closes contacts DR1–2 to connect the selector machine thereto. A signal is thereafter transmitted from selector machine 42 by way of line W2 through contacts DR1–2 to network 30 to bring the car to rest within an acceptable distance of the floor at which it is to stop in the described desirable manner. The potential of this signal varies as a function of the car's distance from the floor at which it will stop in a manner to be hereinafter described. As previously mentioned a selector machine capable of generating a signal of this nature is fully disclosed subsequently.

Throughout the operation of this system tachometer generator 34 is driven by armature 10 and produces a signal whose potential is proportional to the speed of armature 10 and elevator car CA. This signal is fed back through resistor $R_T$ to summation network 30 where in the conventional feedback technique it is combined with the dictated speed signal transmitted through comparator-switch 38 to provide a differential or error signal which insures that the hoisting motor is rotating at the speed being dictated to it. This arrangement is stabilized by feeding back signals representing the higher derivatives of the speed. Thus signals representing acceleration and rate of change of acceleration or deceleration and rate of change of deceleration, as the case may be, are also fed back to summation network 30 to regulate the differential or error signal.

The arrangement by which these stabilizing signals are derived is disclosed and claimed in the previously mentioned co-pending application Ser. No. 495,585. For present purposes, it is sufficient to understand that network 36 is so arranged that the current through it is substantially proportional to the acceleration and deceleration of motor armature 10 and therefore is characteristic of the acceleration and deceleration of elevator car CA. By means of a tap on resistor $R_P$ a signal proportional to the current through network 36 is fed back to summation network 30 through resistor $R_{AF}$ to provide the desired stabilizing feedback signal of acceleration and deceleration.

The desired feedback signal of rate of change of acceleration and deceleration is readily provided in the system by feeding back a signal proportional to the rate of change of the current in feedback network 36 through isolating amplifier or buffer 37 by way of capacitance $C_{AF}$ connected in parallel with resistance $R_{AF}$.

Before proceeding with more specific details of some of the individual elements heretofore mentioned, the embodiment illustrated in FIG. 2 will be described. For this purpose, assume now that the elevator system including the equipment shown in FIG. 2 receives, in any well known manner, a signal to start to move. As described in relation to the operation of the equipment of FIG. 1, function generator 40 begins to generate a signal of the nature of that shown in FIG. 5 which passes through comparator-switch 38, summation network 30 and lag network 32. The signal passing through network 32 is applied to static element power converting equipment 44 wherein it causes that equipment to produce an output voltage which is applied across armature 10 of the elevator drive motor. The forward gain of equipment 44 is such that the magnitude of the signals received by it at the outset of operation causes a current to flow through armature 10 which accelerates the elevator car according to the heretofore prescribed method of operation.

If the car is permitted to run a sufficient distance before receiving a signal to stop, this system operates to bring the car to full rated speed and to rest again in the manner described for the system of FIG. 1. In view of that fact and of the similarity between the equipment of FIG. 1 and that of FIG. 2, it is not believed necessary to present a description of operation of the equipment of FIG. 2 during a full speed run. In order to present a full description of an elevator system including the invention, however, a run of less than full speed will be described. Because the equipment of FIG. 1 has been previously described in detail, a less than full speed run will be described with reference to FIG. 2. It should be understood, however, that just as the equipment of FIG. 2 operates in a manner similar to that of FIG. 1 for a full speed run, so does that of FIG. 1 operate in a manner similar to that of FIG. 2 for a less than full speed run.

Assume now that the car associated with the equipment of FIG. 2 has been started as described but that before it reaches full rated speed and while it is accelerating at a constant acceleration of 4 ft./sec.$^2$, it receives a signal to stop. At that time, illustrated, in FIG. 6 as time "$t_{ss}$," the output signal of function generator 40 ceases to follow the linear shape of the curve of FIG. 5 and conforms to the shape of FIG. 6. As the signal of this latter shape is applied to the system it causes equipment 44 to change the current flowing through armature 10 at a rate whereby the acceleration of the car decreases at the rate of 8 ft./sec.$^3$. This continues for one half second in accordance with the prescribed method of operation until the car is no longer being accelerated. At that time the output signal of function generator 40 decreases and when applied to equipment 44 causes it to change the current flowing through armature 10 so that the car starts to slowdown. The output signal of function generator 40 continues to decrease to further slowdown the car until, for the reason given in the description of operation of the equipment shown in FIG. 1, comparator-switch 38 switches the input connection of network 30 from function generator 40 to selector machine 42. The car is thereafter brought to a stop in the same manner as described in relation to the operation of the equipment of FIG. 1.

In the system of FIG. 2 as in that of FIG. 1 a feedback signal representative of speed is transmitted to summation network 30 from tachometer generator 34 to produce an error signal which insures that motor armature 10 is operating at the speed dictated by the signals from function generator 40 and selector machine 42. Also, feedback signals are transmitted to summation amplifier 30 from the circuit of armature 10 through network 36, buffer 37, resistor $R_{AF}$ and condenser $C_{AF}$ to stabilize the system. Again it is preferred that the magnitudes of the components of feedback network 36 be such that the current through it under conditions of balanced load is proportional to the current which causes the acceleration of motor armature 10 under such conditions.

Heretofore it has been mentioned that, upon the elevator car being enabled to run, function generator 40 generates a signal whose potential with respect to time takes the form of the curve shown in FIG. 5. It has also been mentioned that, when a signal to stop is received before the car reaches full rated speed and while it is accelerating at 4 ft./sec.$^2$, function generator 40 generates a signal whose potential with respect to time ceases to follow the curve of FIG. 5 and conforms to the shape of that of FIG. 6. An embodiment of a function generator which operates in the foregoing manner together with an embodiment of comparator-switch 38 and that of mechanisms which operate to generate signals to stop will now be thoroughly described for two separate runs of an elevator car. The first description follows immediately and explains the operation of this equipment during a full speed run, the other appears later and explains its operation during a less than full speed run.

Assume the elevator car of the system of either FIG. 1 or FIG. 2 is set to travel in a selected direction and that accordingly contacts DGU1–2 (FIG. 3) of a direction reversing switch DGU, not otherwise shown, are closed and contacts DGU3–4 of the same switch are open. In addition, assume that cams 1LC, 3LC and 4LC (FIG. 3) are engaging switches 1LS, 3LS and 4LS so that contacts 1LS1, 3LS1 and 4LS1 are closed, and that a sufficient potential exists between lines L1 and L2 of FIG. 4 to energize the illustrated coils when their circuits are completed. Also assume that a signal to start has been given and that the car starts to close its doors to enable it to run. As the doors close, selector 42, which will hereinafter be described, starts to scan in the direction in which the car is to travel in order to select the next floor at which a stop is to be made. For this purpose, the scanning mechanism of selector 42 moves to a position in advance of the position of the car as indicated by the selector. This movement is such that during scanning the distance advanced in terms of hoistway distance is always greater than the distance required to bring the car to a stop at a selected floor in the manner desired. Also, while its scanning mechanism is in an advanced position selector 42 generates a signal representing the distance advanced. At this time it is believed to be more suitable to a coherent description simply to state that such a signal is generated, rather than to interrupt the present description to describe the signal and the reason why it is generated. Consequently, both the signal and the purpose served by it will be fully detailed at subsequent and more appropriate points in the description.

As it is generated, the signal from selector 42 is transmitted to coil DRSE (FIG. 3) of the differential relay of comparator-switch 38. During the accelerating period of a run and until a hereinafter explained moment during the decelerating period, the signal generated by selector 42 is greater in magnitude than the output signal from function generator 40. For this reason, during this time coil DRSE of the differential relay receives more excitation from selector 42 than coil DRFG receives from sliding contact BR1 of potentiometer POT 1 of function generator 40. As a result throughout this period, contacts DR1–2 of the differential relay are open and contacts DR3–4 of that relay are closed and the output of function generator 40 is transmitted to summation network 30 as hereinbefore described.

As selector 42 starts to scan contacts ADVL1 (FIG. 4) open and interrupt the circuit for the coil of floor stop relay FSR, releasing that relay to open its contacts FSR1–2 and close its contacts FSR3–4. The opening of contacts FSR1–2 interrupts the circuit for the coil of stop control switch SCC which releases but without effect upon the system at this time. Contacts FSR3–4, however, close to energize the coil of delay reversing switch DRK through closed contacts DRKX1–2. Switch DRK thereby operates to open its contacts DRK5–6, DRK7–8 and DRK9–10 and to close its contacts DRK3–4 all without effect at this time. Contacts DRK1–2, however, are closed by the operation of switch DRK to energize reference winding 54 of motor 50 from the line to neutral voltage across lines G3 and N of the three phase supply.

After contacts ADVL1 open, contacts ADVL2 (FIG. 4) engage. When this happens, the coil of dictation start switch STB is energized through closed contacts 4LS1 of the fourth limit switch and switch STB operates to open its contacts STB1–2. This interrupts the circuit for the coil of first limit switch relay 1L, releasing that relay to open contacts 1L3–4 and 1L5–6 and to close contacts 1L1–2. Contacts 1L3–4 and 1L5–6 open without effect at this time. Contacts 1L1–2, however, close to apply the line to line voltage across lines G1 and G2 of the three phase supply to control winding 52 of motor 50 through closed contacts DRK3–4, SCC1–2, 1L1–2 and SCC3–4. Motor 50 starts to rotate and by design accelerates substantially linearly to its running speed in one half second. As a result, the output signal from sliding contact BR1 of linear potentiometer POT 1 increases during this period in the parabolic form shown between points O and A of the curve of FIG. 5 and the car starts with a rate of change of acceleration of 8 ft./sec.³ in the manner previously explained. Thereafter since motor 50 has reached a constant running speed the output signal from sliding contact BR1 increases linearly with time as shown in FIG. 5 to accelerate the car constantly at 4 ft./sec.². The rotation of motor 50 during this time causes cams 1LC, 3LC and 4LC to disengage switches 1LS, 3LS and 4LS which as a result open their contacts 1LS1, 3LS1 and 4LS1. Also cam 2LC engages switch 2LS to cause it to close its contacts 2LS1. Contacts 1LS1 open without effect but contacts 3LS1 and 4LS1 open to deenergize the coils of third limit switch relay 3L and dictation start switch STB, respectively. Each of these in turn releases to close its respective contacts 3L1–2 and STB1–2 without effect. Contacts 2LS1 close to prepare the energizing circuit for the coil of second limit switch relay 2L.

Motor 50 continues to rotate at constant speed until cam 1LC reengages first limit switch 1LS to close again contacts 1LS1. This completes the circuit for the coil of first limit switch relay 1L which thereupon operates to open contacts 1L1–2 and close contacts 1L3–4 and 1L5–6. Contacts 1L5–6 close without effect at this time. Contacts 1L1–2 open to interrupt the circuit for control winding 52 of motor 50 to deenergize that winding. Contacts 1L3–4, in closing, complete a circuit through contacts 3L1–2 to energize the coil of solenoid 64. The deenergization of control winding 52 causes motor 50 to start to slowdown. At the same time the energization of the coil of solenoid 64 caused eddy currents to flow in disc 61 and applies a drag braking force to the motor. In this way motor 50 is caused to decelerate substantially linearly and to come to rest in one half second. During this period the output signal from sliding contact BR1 of potentiometer POT 1 increases in the parabolic form shown between points B and C of the curve of FIG. 5 to a maximum potential. This causes the car's acceleration to decrease at a rate of change of 8 ft./sec.³ until the car reaches full rated speed. Thereafter motor 50 remains in the position in which it came to rest to maintain the output signal of sliding contact BR1 at the maximum value shown in FIG. 5 so that the car continues to run at full rated speed until it receives a signal to stop.

Assume now that selector machine 42 selects a floor at which it is desired to stop the car and stops its scanning operation. As this happens, contacts ADVL1 and ADVL2 (FIG. 4) close and open respectively, without effect at this time. In these circumstances, the elevator car is approaching the selected floor at full speed. At some time during this approach, the car reaches a distance from the floor which has been calculated to be required to slow down the car and bring it to rest in the prescribed manner. When this distance is reached, the selector machine operates full speed distance switch FSD to engage contacts FSD1 to complete the energization circuit for the coil of floor stop relay FSR (FIG. 4) through closed contacts SCCX5–6, 1L5–6 and ADVL1. Relay FSR operates to close its contacts FSR1–2 and to open its contacts FSR3–4. Contacts FSR3–4 open to interrupt the circuit for the coil of delay reversing switch DRK which thereby releases to open its contacts DRK1–2 and DRK3–4 and close its contacts DRK5–6, DRK7–8 and DRK9–10. The closing of contacts DRK9–10 has no effect at this time. Contacts DRK1–2 open and contacts DRK7–8 close to energize reference winding 54 through variable voltage transformer 58 with less than the full potential of the line to neutral voltage across lines G3 to N. Contacts DRK3–4 open and contacts DRK5–6 close to prepare a circuit for control winding 52 to receive less than the full potential of the line to line voltage across lines G1 and G2 through variable voltage transformer 56. The closing of contacts FSR1–2 completes the circuit for the coil of stop control switch SCC. Switch SCC thereby operates to open contacts SCC1–2 and SCC3–4 and to close contacts SCC5–6, SCC7–8 and SCC9–10. Contacts SCC1–2 and SCC3–4 open and contacts SCC5–6 and SCC7–8 close in preparation for the reversal of the connection of the line to line voltage across lines G1–G2 to control winding 52. Contacts SCC9–10 close to complete the energizing circuit for the coil of second limit switch relay 2L through closed contacts 2LS1. Relay 2L operates to engage contacts 2L1–2, 2L3–4 and 2L5–6. The engagement of contacts 2L3–4 and 2L5–6 have no effect upon the system at this time.

Contacts 2L1–2 complete the circuit for control winding 52 through variable voltage transformer 56 and contacts DRK5–6, SCC5–6 and SCC7–8 causing motor 50 to start to rotate in the direction opposite to that in which it last moved.

According to the prescribed operation motor 50 should be accelerated substantially linearly to its full speed in the opposite direction in one-half second so that the output signal from sliding contact BR1 would decrease in a manner which would cause motor armature 10 (FIG. 1 or 2) to start to slow down the car at a rate of change of deceleration of 8 ft./sec.³. In a tested embodiment, however, it has been found that a smooth and more positive transition to distance control is insured if the slowdown of the car is started with a rate of change of deceleration slightly less than 8 ft./sec.³. For this reason, as slowdown is initiated, the energization of reference winding 54 and control winding 52 is reduced from the pull potential of their applied voltages and solenoid 64 of eddy current brake 62 is maintained energized. It takes motor 50, therefore more than one-half second to accelerate to a constant running speed in the opposite direction and, as a result, the output signal from sliding contact BR1 decreases in such a manner as to cause motor armature 10 (FIG. 1 or 2) to start to slow down the car at a rate of change of deceleration of slightly less than 8 ft./sec.³. The portion of the curve of FIG. 5 shown after time "$t_{ss}$" represents the output signal from sliding contact BR1 during this period.

It should be understood that after selector machine 42 selects a floor at which a stop is to be made and stops scanning, the distance between the location of its scanning mechanism at a position indicative of the selected floor and the location of the car as indicated by the selector decreases as the distance the car is from the level of the selected floor decreases. Accordingly, the generated output signal from selector 42 decreases. With respect to the ordinate voltage scale of FIG. 7, curve B illustrated the manner in which the potential of this signal decreases as a function of the distance the car is from the level of the selected floor until the car is within approximately one foot of that level. At some distance from the floor, the potential of the decreasing output signal from selector 42 equals the potential of the output signal from function generator 40. Preferably, the manner in which the output signal from selector 42 decreases is such that this equality exists at approximately the time the output signal from function generator 40 is at point D of FIG. 5. When both signals are equal, the output signal from sliding contact BR1 of potentiometer POT 1 of function generator 40 excites coil DRFG (FIG. 3) of the differential relay of comparator-switch 38 as much as the output signal from the selector machine 42 excites coil DRSE. At that time the differential relay operates to open contacts DR3–4 and close contacts DR1–2. This disconnects the output of function generator 40 from the input circuit of summation network 30 and connects the output of selector machine 42 thereto. Network 30 thereafter receives the output signal from selector machine 42. As will be explained, this signal is designed so that it slows the car down at a constant deceleration of 4 ft./sec.² in accordance with the prescribed operation.

As previously mentioned at a distance of approximately one foot from a floor level at which a car is to stop, it is desired that the output signal from selector machine 42 vary the car's operation, from that prescribed. As has been stated, this variation takes places in a manner consistent with stability which accurately brings the car to the floor as rapidly as comfort permits regardless of load. Furthermore, this same signal from selector 42 insures that as long as the system is connected such that selector 42 provides its output signal to network 30, the car is maintained level with the floor to which it is brought even though passenger transfers may cause contraction and expansion of the hoist ropes. This has been provided satisfactorily in a tested embodiment by varying the output signal from selector machine 42 with respect to distance so that the potential of this signal and the velocity dictated by it both vary between a floor level and approximately one foot distance therefrom according to curve C shown in FIG. 9. A comparison on the voltage ordinate scale of this curve with the portion of curve B of FIG. 7 shown in enlarged scale in FIG. 9 shows that for any distance from the floor between approximately one foot and two feet the ordinates of curves B and C coincide substantially. By so matching these curves a smooth transition from the prescribed method of operation to that desired with this system is insured.

Thus, as the car arrives approximately one foot from the level of the floor at which it is to stop the output signal of selector machine 42 ceases to follow curve B of FIG. 7 and conforms to curve C of FIG. 9. As desired, this signal rapidly brings the car the remainder of the distance into the floor and insures that after the car has stopped it will stay level with the floor without oscillating thereabout should the expansion and contraction of the ropes caused by passenger transfers tend to charge its position with respect to the floor.

While the foregoing slowdown is taking place and after selector 42 is connected to summation network 30, it should be understood that motor 50 continues to rotate at a reduced speed against the force of eddy current brake 61. This causes cam 1LC to disengage first limit switch 1LS to open contacts 1LS1 and interrupt the circuit for the coil of first limit switch relay 1L. Relay 1L releases to open its contacts 1L3–4 and 1L5–6 and to close its contacts 1L1–2 without effecting the system. In addition, cam 4LC engages fourth limit switch 4LS to close contacts 4LS1, also without effect at this time because contacts ADVL2 have been opened since selector machine 42 stopped scanning. Motor 50, therefore, continues to drive contact BR1 toward its original position against the force of brake 61 until cam 3LC reengages third limit switch 3LS and causes contacts 3LS1 to close. This completes the circuit for the coil of third limit switch 3L causing it to operate to open its contacts 3L1–2. When this happens, the circuit for the coil of solenoid 64 is interrupted and the drag braking force of eddy current brake 61 is removed. By the removal of the drag braking force of eddy current brake 62, motor 50 is free to drive sliding contact BR1 rapidly toward its original position on potentiometer POT 1 in preparation for the next trip of the car. Just prior to contact BR1 arriving at its original position cam 2LC disengages second limit switch 2LS to open contacts 2LS1 and cam 1LC engages first limit switch 1LS to close contacts 1LS1 in preparation for the next trip of the car. This interrupts the circuit for the coil of second limit switch relay 2L and completes the circuit for the coil of first limit switch relay 1L causing contacts 2L1–2 and 1L1–2 to open. In opening, contacts 2L1–2 and 1L1–2 interrupt the circuit for reference winding 52 and motor 50 coasts to a stop. Function generator 40 is now prepared for the next trip of the car.

In the operation in the immediately preceding description, the car ran a sufficient distance to enable it to reach full rated speed before a signal to stop was received. It has been mentioned previously that a less than full speed run would also be described. The description of such an operation now follows.

It will be recalled that as the car is set to travel in a selected direction, direction reversing switch DGU operates to open contacts DGU3–4 and close contacts DGU1–2 but that before the car starts to move and as the doors close, selector 42 starts to scan in the direction in which the car is to travel in order to select the next floor at which a stop is to be made. It will also be recalled that after selector 42 starts to scan, motor 50 starts to rotate and function generator 40 generates a signal which starts to accelerate the car in the prescribed manner. As previously explained, after motor 50 starts to rotate, cams 1LC thru 4LC operate their respective switches 1LS thru 4LS. As a result contacts 1LS1, 3LS1 and 4LS1 open and contacts 2LS1 close.

Assume now that selector 42 selects a floor at which it is desired to stop the car and stops its scanning operation. Also assume that the floor is not a sufficient distance beyond the floor from which the car starts its travel to permit it to reach full rated speed. In these circumstances the stopping operation of the car is initiated by a signal to stop which is received while the car is accelerating at a constant acceleration of 4 ft./sec.$^2$. As previously mentioned, passenger comfort can be assured throughout this operation by initiating the stop when the velocity of the car and its distance from the selected floor are such that the acceleration of the car can be decreased at a rate of change of 8 ft./sec.$^3$ for one half second until the acceleration ceases, whereupon the car can be slowed down at a rate of change of deceleration of slightly less than 8 ft./sec.$^3$. When a deceleration of 4 ft./sec.$^2$ is attained the car can be brought to a stop in accordance with the herinbefore described desired operation.

At the time a signal to stop initiates this desired stopping operation during a car's constant acceleration period, a relationship exists between the instantaneous velocity of the car and its distance from the selected floor at which it is to stop. This relationship is readily determinable from straightforward mathematics and is graphically illustrated in FIG. 7 with respect to the ordinate velocity scale by the curve marked A. From this, it should be understood that the signal to stop is to be generated whenever the instantaneous velocity of the car and the distance remaining to the selected floor level at that instant both satisfy coordinates on this curve. It is now appropriate to examine how and by what means it is determined when to generate this stopping signal.

As will be recalled from the prior description of the full speed run, curve B of FIG. 7 represents the manner in which the potential of the output signal from selector 42 decreases after floor selection. As explained, it decreases in this manner as the distance the car is from a selected floor decreases, until the car is within approximately one foot of the floor selected. From this prior description, it should also be understood that whenever a car is more than one foot from a selected floor, the output signal from selector 42 represents the velocity at which a car should be traveling during its constant deceleration period if it is to stop at the selected floor in the manner desired. In addition, it should be appreciated that after selector 42 has selected a floor and, until the car is within approximately one foot of the floor selected the decreasing output signal from selector 42 represents this constant deceleration velocity as a function of the distance the elevator car is from the floor selected. For this reason, at distance greater than one foot, curve B, represents this velocity plotted on the ordinate velocity scale of FIG. 7.

It is to be remembered, of course, that when selector 42 selects a floor during a less than full speed run, the elevator car is not undergoing constant deceleration but rather is experiencing constant acceleration. Thus, to insure passenger comfort, the car must first go through a transition from constant acceleration to a decelerating condition before the output signal from selector 42 can be employed to control the speed of the car. This is accomplished by generating the signal to stop after floor selection when the car velocity and its distance from the selected floor satisfy coordinates of curve A on FIG. 7. As has been explained, the coordinates of this curve represent the velocity a car undergoing constant acceleration can attain for its distance from a selected floor at the time a signal to stop is generated. This velocity it should be understood is the maximum velocity the car can attain for its distance from a selected floor before its acceleration must start to decrease. At that velocity and distance, a relationship exists between that velocity as represented by the coordinates of curve A and the velocity at that distance for a car undergoing constant deceleration as represented by the coordinates of curve B. This relationship is defined by the equation:

$$V_s 2 = V_T 2 + 8 V_T + \frac{16}{3} \quad (1)$$

where $V_s$ = the constant deceleration velocity represented by the selector output signal after the selection of a floor at which a stop is to be made $V_T$ = the constant acceleration velocity of the car represented by the tachometer generator output signal.

In other words, after a floor has been selected, the signal to stop is to be given whenever the velocity of the car and the velocity represented by the output signal from the selector bear the relationship to each other defined by the above equation. For present purposes, however, and for car speeds of interest i.e. from 3.75 ft./sec. to about 27 ft./sec. it has been found satisfactory to generate the signal to stop when these velocities bear a less complex relationship to each other. This relationship is defined by the equation.

$$V_s = 1.04 \ V_T + 3.2 \text{ ft./sec.} \quad (2)$$

or $$V_s - 1.04 \ V_T - 3.2 \text{ ft./sec.} = 0 \quad (3)$$

A device which computes the existence of this latter equality and generates a signal to stop as a result is shown in FIG. 8.

In order to understand the operation of the equipment shown in FIG. 8, the description of the less than full speed run will now be continued. It will be recalled that the car is set for a selected direction of travel and that contacts DGU1–2 are closed. This causes a false, or binary zero (0), signal to appear at input $\overline{\text{DGU}}$ (FIG. 8) of "NOR" circuit N1. It will also be recalled that selector 42 has stopped its scanning and has selected a floor at which it is desired to stop. This operated to cause a false signal to appear at input $\overline{\text{ADVL}}$ (FIG. 8) of "NOR" circuit N4.

The position of the scanning mechanism of selector 42 in advance of the location of the car causes the selector to generate an output signal which is transmitted to inputs $V_s$ (FIG. 8) of the up and the down differential amplifiers 72 and 74. Assume now that the selected direction of travel of the car is the up direction. Also assume that in such circumstances, the output signal from selector 42 is positive in polarity and that from tachometer generator 34 (FIGS. 1 and 2), appearing at inputs $V_T$ (FIG. 8) of differential amplifiers 72 and 74, is negative. For the opposite direction of travel, of course, both polarities are reversed. As a result of the polarization of these signals, the equation used in computing the existence of the proper conditions for generating the signal to stop is implemented for both directions of travel as shown in FIG. 8.

As the acceleration of the car continues, the magnitude of the output signal from tachometer generator 34 increases. During the same period the car is getting nearer the floor which the scanning mechanism has selected and as a result the magnitude of the output signal from selector 42 is decreasing. By setting rheostats RH1 and RH2 (FIG. 8) at the proper resistance values the scales of volts per unit of velocity for the input signals from tachometer generator 34 and selector machine 42 are placed in the relationship of 1.04 to 1 with respect to each other. Thus, when the car reaches that distance from the floor at which the signal to stop should be given as previously explained, the input signal to up differential amplifier 72 from selector 42, is equal in magnitude to the input signal to amplifier 72 from tachometer generator 34 plus the input signal representing minus 3.2 ft./sec. Under such conditions, the sum of the inputs to amplifier 72 is zero volts causing it to produce a false signal at input L12 of "NOR" circuit N1. This makes both inputs to this circuit false and causes it to produce a true, or binary one (1), signal at its input to "NOR" circuit N3. As a result "NOR" circuit N3 produces a false output signal which appears at input L14 of "NOR" circuit N4. Both inputs to circuit N4 being false, it produces a true, or binary one (1). This is applied to relay driver amplifier 76 to produce a signal which causes the coil of auxiliary stop control switch SCCX to be energized through the circuit of closed contacts FSR5–6 and 1L7–8 to supply L15. Switch SCCX thereby operates to open contacts SCCX3–4 (FIG. 4) and close contacts SCCX1–2 (FIG. 4). In opening, contacts SCCX3–4 interrupt the circuit for the coil of auxiliary delay reversing switch DRKX and condenser CDRKX starts to discharge through that coil and resistor RDRKX. In the meantime, the closing of contacts SCCX1–2 energizes the coil of stop control switch SCC which operates to open its contacts SCC1–2 and SCC3–4 and to close its contacts SCC5–6, SCC7–8 and SCC9–10. The opening of contacts SCC1–2 and SCC3–4 and the closing of contacts SCC5–6 and SCC7–8 reverse the connection of the line to line voltage applied across lines G1–G2 to control winding 52. Contacts SCC9–10 close to complete the energizing circuit for the coil of second limit switch relay 2L through closed contacts 2LS1. Relay 2L operates to engage contacts 2L3–4 to energize the coil of solenoid 64 of eddy current brake 62 through contacts 3L1–2, which previously were closed as a result of the opening of contacts 3LS1. Because of the inertia of motor 50, the reversal of the connection of the energizing source to control winding 52 does not cause motor 50 to reverse its direction of rotation immediately. It does, however, start to slowdown. At the same time the energization of the coil of solenoid 64 causes eddy currents to flow in disc 61 and applies a drag braking force to the motor. In this way motor 50, by design is caused to decelerate substantially linearly and to come to rest in one half second. During this period the output signal from sliding contact BR1 of potentiometer POT 1 increases in the parabolic form shown between points B and C of the curve of FIG. 6. This causes the car's acceleration to decrease at a rate of change of 8 ft./sec.$^3$ until the acceleration is zero. When this occurs condenser CDRKX is discharged sufficiently to release auxiliary delay reversing switch DRKX to open its contacts DRKX1–2. This interrupts the circuit for the coil of delay reversing switch DRK and releases that switch to open contacts DRK1–2 and DRK3–4 and close contacts DRK5–6, DRK7–8 and DRK9–10. In closing, contacts DRK9–10 provide an additional path for the energizing current for the coil of solenoid 64. Contacts DRK1–2, DRK3–4, DRK5–6 and DRK7–8 operate to connect control winding 52 and reference winding 54 across lines G1, G2, G3 and N through variable voltage transformers 56 and 58 and thereby reduce their energizing potential from the three phase supply. Motor 50, after coming to rest, reverses its direction of rotation, and the reduced energizing potential causes it to take more than one-half second to accelerate to a constant running speed in the reverse direction. As a result the output signal from sliding contact BR1 decreases in the manner shown between points C and D of FIG. 6 so as to cause the car to start to slowdown at a rate of change of deceleration of slightly less than 8 ft./sec.$^3$. At approximately the time that the output signal from function generator 40 is at point D of FIG. 6 a smooth transition to distance control occurs through the operation of comparator-switch 38 and the car is brought into the floor in the same manner as heretofore described for a full speed run. After this transition occurs, motor 50 is operated to return sliding contact BR1 to its original position preparatory to the next trip of the car, also in the same manner as previously described.

DESCRIPTION OF SELECTOR MACHINE SUITABLE FOR USE WITH THE SYSTEMS OF FIG. 1 AND FIG. 2

As previously explained, selector machine 42 is a device which scans the floors in advance of the car to select the next floor at which the car is to stop. In addition, for purposes heretofore mentioned this device generates four signals. A first signal which commences when the selector starts its scanning operation and ceases when the selector stops scanning. The source of this signal has previously been designated by contacts ADVL1 (FIG. 4). A second signal which commences and ceases shortly after the first signal commences and ceases. Contacts ADVL2 (FIG. 4) have previously been designated as the source of this signal. A third signal which exists whenever the car is full speed stopping distance or less from a floor at which it is to stop. The source of this signal has previously been designated by contacts FSD1 (FIG. 4). A fourth signal which is a continuous indication of the distance the scanning mechanism is in advance of the indicated position of the car.

There are known devices which generate these signals. One which may be used with the present invention is the device described in U.S. Pat. No. 2,306,817, issued Dec. 29, 1942, to D. C. Larson. In employing this device, the first signal may be generated by breaking contacts (i.e. contacts which disengage and engage when the coil of the switch which operates them is energized and deenergized, respectively) of the first auxiliary stopping relay A; the second signal, by making contacts (i.e. contacts which engage and disengage when the coil of the switch which operates them is energized and deenergized, respectively) of the second auxiliary stopping relay B; the third signal, by switch 162 if it is set to close when the car is full speed stopping distance from a floor at which it is to stop; and the fourth signal, by the angular position of shaft 694.

Another device suitable to generate these signals is disclosed in the copending application of Otto Albert Krauer et al., Ser. No. 495,446, filed Oct. 13, 1965, for "Elevator Control System," and assigned to the same assignee as is the instant application. For present purposes, however, assume the device disclosed in the forementioned Larson patent is employed for use with the systems of the present invention.

It is appropriate, at this time, to consider how selector 42 transduces the angular position of shaft 694 into a signal suitable to perform the functions previously attributed to it. As will be recalled, at distances greater than one foot, this signal corresponds to curve B of FIGS. 7 and 9. From FIG. 10 it can be seen that shaft 694 drives sliding contacts BR10 and BR11 of potentiometers POT 10 and POT 11 through suitable gearing. The voltages at sliding contacts BR10 and BR11 are each a function of the distance between the scanning mechanism of selector 42 and the indicated position of the car. From previous explanations it will be appreciated that after floor selection, it is desired that these voltages, although functions of distance, each have a form which will dictate the described operation as if each were a function of time. The following describes how this is achieved.

It has been stated that the curve of FIG. 11 represents the velocity characteristics for a typical run of an elevator car operated in the prescribed manner. Consider this curve in the region from its origin to point A. In this region, according to the prescribed operation, the jerk, $j$, is constant and equal to 8 ft./sec.$^3$. Assuming that the car starts from a first landing at $t=0$ and that distance is measured from this landing, the following relationships can be derived by straightforward mathematics.

$$\text{Jerk} = j = 8 \text{ ft./sec.}^3 \qquad (4)$$

$$\text{Acceleration} = a = 8t \qquad (5)$$

$$\text{Velocity} = v = 4t^2 \qquad (6)$$

$$\text{Distance} = s = \tfrac{4}{3}t^3 \qquad (7)$$

$$\text{Velocity} = v = (6s)^{2/3} \qquad (8)$$

This portion of the curve extends until time $t_1$, at which time $a = 4$ ft./sec.$^2$.

$$t_1 = \tfrac{1}{2} \text{ second}$$
$$v = 1 \text{ ft./sec.}$$
$$s = \tfrac{1}{6} \text{ foot}$$

Now, consider the portion of the curve from point A to point B, where $a = 4$ ft./sec.$^2$. Starting with the initial conditions that at $s = \tfrac{1}{6}$ foot, $v = 1$ ft./sec. it can be shown by straightforward mathematics, that for this portion of the curve $$v = \tfrac{1}{3}\sqrt{72s - 3} \qquad (9)$$

$$V^2 = 8s - \tfrac{1}{3} \qquad (10)$$

$$s = \tfrac{v^2}{8} + \tfrac{1}{24} \qquad (11)$$

Because the curve of FIG. 11 is symmertical, the above expressions, although derived for the portion of the curve between its origin and point B, are equally applicable for the prescribed method of operation to the portion of the curve from $t_4$ to $t_6$ if we regard the distance $s$ as zero at $t_6$ and increasing to the left toward $t_4$.

Curve B of FIGS. 7 and 9 are a graph of Equations 8 and 9 showing the prescribed velocity during deceleration as a function of distance from a selected floor. The portion above $s = \tfrac{1}{6}$ foot is a plot of Equation 9. In order to generate a signal indicative of this velocity the potentiometer POT 10 (FIG. 10) is made non-linear on each side of its center tap in accordance with Equation 9. Such a potentiometer may be made by well known techniques, starting with a linear potentiometer with many taps and adding suitable shunts. Voltages of opposite polarities V1+, V1— are applied to the extremeties and the center tap is grounded. Therefore, the output voltage from sliding contact BR10 indicates, by its polarity, whether the car is above or below a selected landing, and represents, by its magnitude, the velocity at which the car should be traveling during its constant deceleration period at any distance from a selected floor, if it is to stop in the prescribed manner. Of course, the magnitude of voltages V1+, V1— are sufficient to extend the magnitude of the output voltage from contact BR10 to and beyond that indicative of the full speed stopping distance. It should be also understood that potentiomeer POT 10 is suitable to provide the prescribed operation only at distances greater than $\tfrac{1}{6}$ foot from the landing and, furthermore, as has been explained, that that operation is desirable only at distances greater than about one foot.

The portion of curve B of FIG. 9 below $\tfrac{1}{6}$ foot has a slope which becomes infinite as the distance from the floor approaches zero. If a signal were to be generated in accordance with this curve, it would dictate a very large change in velocity for a very small change in distance. Systems like those of FIGS. 1 and 2 which could follow such a signal in the region near zero would be required to have substantially infinite gain. This, of course, is not feasible. Additionally, as the gain of these systems is increased, problems of stability increase. These considerations impose a practical upper limit on the slope of the velocity versus distance curve in the region closer than $\tfrac{1}{6}$ foot from a selected floor.

It must be remembered that the elevator car is not only to stop accurately at a landing but is also to stay level with a landing should expansion and contraction of the hoist ropes caused by passenger transfers tend to change the position of the car with respect to a landing. Such operations require that a signal of reasonable magnitude be generated when the car is within a region of a few inches on either side of a landing level. For this reason, a practical lower limit is imposed on the slope of the velocity versus distance curve in this region.

For the above reasons, curve B is replaced, in the region near zero distance, with curve C of FIG. 9. This curve is derived by first determining reasonable minimum and maximum slopes based on the foregoing considerations of gain, stability and accuracy. Next the first portion of curve C is drawn, keeping its slope less than the maximum, and greater than the minimum, in the region below $\tfrac{1}{6}$ foot, to provide a signal adequate for accuracy purposes in this region. The remainder of curve C is extended from the first portion, either continuously or in steps, so as to joint smoothly with curve B being careful not to exceed the maximum slope. It has been found feasible to make a smooth transition at a distance of approximately one foot by making the ordinates of curve C substantially equal to those of curve B in the region from one to two feet.

Potentiometer POT 11 (FIG. 10) is constructed to have a non-linear resistance versus rotation characteristic on each side of its center tap in accordance with curve C of FIG. 9, regarding the abscissa as degree of rotation and the ordinate as resistance. A one turn potentiometer has been found to be satisfactory for potentiometer POT 11 and may also be constructed by connecting suitable shunts across a plurality of taps. As in the case of potentiometer POT 10, voltages of opposite polarities V2+, V2— are connected to opposite extremities and the center tap is grounded. Potentiometer POT 11 may be connected in place of potentiometer POT 10 when the elevator car is anywhere in the region between one and two feet from the landing. Switching may be effected by switch SPDS which is operated in this region by shaft 694 through gear box XB1 in the manner in which switch FSD is operated.

One effect of using curce C instead of curve B is that the time required to bring the car to the landing is increased. However, the increase is small because the variation from the prescribed operation to the desired one is slight and occurs only in the region below one foot.

From the foregoing description of the invention it can be seen that there is provided an elevator control servo system in which the speed of the hoist motor controlling the velocity of the car is varied in a continuous stepless fashion. In response to a starting signal, a device called a selector starts to scan the floors in advance of the car to select the next floor at which a stop is to be made. This enables a function generator of the system to generate a time controlled function representing desired speed charbacteristics of the hoist motor. This function is employed to cause a variable voltage source to provide excitation to the hoist motor. A stabilizing network together with a speed responsive signal source in the form of a tachometer provide feedback signals which are compared with the time controlled function to insure that the motor is operating in accordance with the desired speed characteristics. After the next floor at which the car is to stop is selected and when the car is a predetermined distance from the floor selected, a signal to stop is generated. This causes the time controlled function to vary its characteristics such that the variable voltage source changes the current of its excitation to the hoist motor and causes it to start to slowdown. During this slowdown operation the variable voltage source is disconnected from the function generator and connected to the selector. In this way control of the variable voltage source is transferred from a time controlled function to a distance controlled one. The selector, thereafter, generates this distance controlled function to bring the car rapidly and accurately to rest at the selected floor.

It should be noted that this invention provides the same acceleration and retardation characteristics for both a full speed run and a less than full speed run. The only difference between these runs being the duration for which the car undergoes acceleration and deceleration.

It should also be apparent from the foregoing that once the desired speed characteristics of the elevator have been determined, the function generator and the selector can be designed and manufactured to provide these characteristics without the necessity of extensive adjustments at the installation site.

Although the method of operation described is specific to particular magnitudes of acceleration, deceleration and jerk it should be appreciated that the invention is not limited to these magnitudes. Various other modifications are also possible, and it is intended that the embodiments specifically described not be considered to be exclusive or in any sense limiting.

What is claimed is:

1. A control system for operating an elevator car in which the car starts from one floor in response to a starting signal and travels to another floor at which it stops in response to a stopping signal, comprising;
    a motor having a rotating element for driving said car in its travel;
    a source of voltage of variable magnitude connected to said motor and providing said motor with voltage whose magnitude controls the speed of rotation of said rotating element;
    a function generator generating a predetermined signal, variable as a function of time in a continuous stepless fashion, connectable to said source of voltage to control the magnitude of said voltage in a predetermined manner according to time;
    a device generating a predetermined signal, variable in a continuous stepless fashion as a function of the distance the car is from a floor at which it is to stop, connectable to said source of voltage to control the magnitude of said voltage in a predetermined manner according to the distance the car is from a floor at which it is to stop;
    switching means connected to said function generator and to said device and operable in response to the magnitudes of said function generator signal and said device signal to connect said function generator and said device to said source of voltage;
    a speed responsive signal source responsive to the speed of said car connected to said source of voltage and providing signals, indicative of the actual speed of said car, to said signal source to control the magnitude of its voltage;
    and means, connected to said source of voltage and providing signals, indicative of the rate of change of speed of the rotating element and the rate of change of the rate of change of the speed of the rotating element, to said source of voltage to control the magnitude of its voltage.

2. A control system according to claim 1, wherein said switching means includes equipment connecting said generator to said source at the start of travel of the elevator car and during an initial portion of said travel and disconnecting said generator from said source during a latter portion of the travel of the elevator car, said equipment disconnecting said generator from said source when it connects said device thereto.

3. A control system according to claim 2, wherein said equipment includes means comparing the magnitude of the generator signal with the magnitude of the device signal and connecting the device to said source of voltage when the magnitude of its signal is substantially equal to the magnitude of the generator signal.

4. A control system according to claim 3, wherein said comparing means includes a differential relay with two opposed windings, one winding connected to said generator and receiving said generator signal and the other winding connected to said device and receiving said device signal.

5. A control system for operating an elevator car in an installation in which the armature of a motor accelerates and decelerates a plurality of members including the elevator car and a counterweight in which the car starts from one floor in response to a starting signal and travels to another floor at which it stops in response to a signal to stop, said system comprising;
    a source of voltage of variable magnitude having an input circuit and an output circuit, said output circuit being connected to said motor to control the speed of said armature according to signals applied to said input circuit;
    a function generator generating a predetermined signal, variable as a function of time, connectable to said input circuit at each start of travel of said car to provide said predetermined signal to said input circuit to cause said source of voltage to control the armature to accelerate the car;
    a device generating a predetermined signal, variable as a function of the distance the elevator car is from a floor at which it is to stop, connectable to said input circuit to cause said source of voltage to control the armature of said motor to decelerate the car;
    first means including a speed responsive signal source, responsive to the actual speed of said elevator, connected to said input circuit and applying signals thereto indicative of the speed of said car;
    said first means also including a circuit connected to said input circuit and applying thereto regulating signals characteristic of the acceleration and the deceleration and the rate of change of both that the elevator car actually undergoes while traveling;
    and switching means connected to said generator and to said device and responsive to the magnitudes of said generator signal and said device signal and connecting said generator and said device to said source.

6. A control system according to claim 5, wherein said switching means includes equipment connecting said generator to said input circuit during the initial portion of the travel of said car and disconnecting said generator from said input circuit during a latter portion of the travel of said car, said equipment disconnecting said generator from said input circuit when it connects said device thereto.

7. A control system according to claim 6, wherein said equipment includes means comparing the magnitude of the generator signal with the magnitude of the device signal and connecting the device to said input circuit when the magnitudes of both signals are substantially equal.

8. A control system for operating an elevator car in an installation in which the rotating element of a motor drives a plurality of masses including the elevator car and a counterweight and in which the car starts from one floor in response to a starting signal and travels to another floor at which it stops in response to a signal to stop, said system comprising;
    a source of variable voltage having an input circuit and an output circuit, said output circuit being connected to said motor to control the speed of rotation of said rotating element; according to signals provided to said input circuit;
    means connected from said motor to said input circuit and providing signals to said input circuit characteristic of the acceleration and the rate of change of acceleration said rotating element actually experiences while driving said masses;
    a speed responsive signal source responsive to the speed of said elevator car connected to said input circuit and providing signals to said input circuit, indicative of the actual speed of said elevator car;
    a function generator including a motor driven potentiometer generating a predetermined signal whose magnitude increases as a continuous function of time from the generation of the starting signal for each trip of the car to the end of the acceleration period of each trip, said generator being connectable to said input circuit to provide said predetermined signal thereto;

a device including a potentiometer whose sliding contact is moved in response to movement of the car for generating a predetermined signal whose magnitude decreases as a continuous function of the distance the elevator car is from a floor at which it is to stop, said device being connectable to said input circuit to provide said predetermined signal thereto;

and switching means connected to said generator and said device and responsive to the magnitudes of said generator signal and said device signal and connecting said generator and said device to said source.

9. A control system according to claim 8, wherein said switching means includes equipment connecting said generator to said input circuit during the initial portion of the travel of said car and disconnecting said generator from said input circuit during a latter portion of the travel of said car, said equipment disconnecting said generator from said input circuit when it connects said device thereto.

10. A control system according to claim 9, wherein said equipment includes means comparing the magnitude of the generator signal with the magnitude of the device signal and connecting the device to said input circuit when the magnitudes of both signals are substantially equal.

11. A control system for operating an elevator car in an installation in which the car starts from one floor in response to a starting signal and travels to another floor at which it stops in response to a signal to stop, and in which the armature of a motor drives a plurality of masses including the elevator car and a counterweight, said system comprising;

a summation network receiving signals applied to it and producing combined signals according to the magnitude of the signals applied to it;

a source of voltage of variable magnitude connected to said summation network and receiving said combined signals, said source having a circuit connected to said motor and applying voltage to said motor which controls the speed of rotation of said armature according to said combined signals;

a speed responsive signal source responsive to the speed of said car connected to said summation network and applying signals, indicative of the actual speed of said car, to said summation network;

means connected from the armature of said motor to said input circuit and applying signals to said summation network characteristic of the acceleration and the rate of change of acceleration the armature actually experiences while driving said masses;

a function generator generating a predetermined signal whose magnitude varies in a continuous stepless fashion as a function of time, connectable to said summation network to apply its generated signal thereto;

a device generating a predetermined signal, variable in a continuous stepless fashion as a function of the distance the elevator car is from a floor at which it is to stop, connectable to said summation network to apply its generated signal thereto;

and switching means connected to said generator and to said device and responsive to the magnitudes of said generator signal and said device signal and connecting said generator and said device to said summation network one at a time.

12. A control system according to claim 11, wherein said switching means includes equipment connecting said generator to said summation network at the start of travel of the elevator car and during an initial portion of said travel and connecting said device to said summation network during a latter portion of the travel of the elevator car, said equipment disconnecting said generator from said summation network when it connects said device thereto.

13. A control system according to claim 12, wherein said equipment includes means comparing the magnitude of the generator signal with the magnitude of the device signal and connecting said device to said summation network when the magnitude of its signal is substantially equal to the magnitude of the generator signal.

14. A control system according to claim 13, wherein said comparing means includes a differential relay with two opposed windings, one winding connected to said generator to receive said generator signal and the other winding connected to said device to receive said device signal.

15. A control system for operating an elevator car in which the car starts from one floor in response to a starting signal and travels to another floor at which it stops in response to a signal to stop, comprising;

a motor having a rotating element for driving said car in its travel;

a source of voltage of variable magnitude connected to said motor to provide said motor with voltage whose magnitude controls the speed of rotation of said rotating element;

first means for selecting a floor at which a stop is to be made in advance of the car reaching that floor;

second means responsive to the selection of a floor at which a stop is to be made for generating a signal variable as a function of the distance the selected floor is in advance of the car;

a speed signal source connected to said motor providing signals characteristic of the speed of said car;

and third means responsive to a predetermined condition existing between the signal generated by said second means and said signal characteristic of speed for generating a signal to stop.

16. A control system for operating an elevator car in which the car starts from one floor in response to a starting signal and travels to another floor at which it stops in response to a signal to stop, comprising;

a motor having a rotating element for driving said car in its travel;

a source of voltage of variable magnitude connected to said motor to provide said motor with voltage whose magnitude controls the speed of rotation of said rotating element;

first means for selecting a floor at which a stop is to be made in advance of the car reaching that floor;

second means, responsive to the selection of a floor at which a stop is to be made for generating a predetermined signal, variable in magnitude in a continuous stepless fashion as a function of the distance the selected floor is in advance of the car, connected to said source of voltage to control the magnitude of its voltage according to the distance the selected floor is in advance of the car;

a speed responsive signal source responsive to the speed of said car connected to said source of voltage to provide a signal, proportional to the speed of said car, to said source of voltage to control the magnitude of its voltage;

and third means, responsive to a predetermined relationship existing between said predetermined signal generated by said second means and said signal proportional to speed, for generating a signal to stop.

17. A control system for operating an elevator car in which the car starts from one floor in response to starting signal and travels to another floor at which it stops in response to a signal to stop comprising;

a motor having a rotating element for driving said car in its travel;

a source of voltage of variable magnitude connected to said motor to provide said motor with voltage whose magnitude controls the speed of rotation of said rotating elements;

first means for selecting a floor at which a stop is to be made in advance of the car reaching that floor;

second means, responsive to the selection of a floor at which a stop is to be made, for generating a predetermined signal, variable in magnitude in a continuous stepless fashion as a function of the distance the selected floor is in advance of the car, connectable to said source of voltage to control the magnitude of its voltage according to the distance the selected floor is in advance of the car;

a speed responsive signal source responsive to the speed of said car connected to said source of voltage to provide a signal, proportional to the speed of said car, to said source of voltage to control the magnitude of its voltage;

third means, responsive to a predetermined relationship, existing between said predetermined signal generated by said second means and said signal proportional to speed for generating a signal to stop;

fourth means, for generating a signal, variable in magnitude in a continuous stepless fashion as a function of time, connectable to said source of voltage and responsive to a starting signal to control the magnitude of the voltage of said source to start the car with an increasing acceleration for an initial period, to accelerate the car with a constant acceleration during a second period and to bring the car to full speed with a decreasing acceleration during a third period;

said fourth means being responsive to the generating of a signal to stop during said second period for altering its generated signal in a manner which causes said voltage source to vary the magnitude of its voltage to stop said constant acceleration, to bring the car to a maximum speed with a decreasing acceleration and to start to slow the car down with an increasing deceleration;

and switching means connected to said second means and said fourth means and responsive to the magnitudes of the signals of said second and said fourth means for connecting said second means and said fourth means to said source of voltage.

18. A control system for operating an elevator car in which the car starts from one floor in response to starting signal and travels to another floor at which it stops in response to a signal to stop comprising:

a motor having a rotating element for driving said car in its travel;

a source of voltage of variable magnitude connected to said motor to provide said motor with voltage whose magnitude controls the speed of rotation of said rotating elements;

first means for selecting a floor at which a stop is to be made in advance of the car reaching that floor;

second means, responsive to the selection of a floor at which a stop is to be made, for generating a predetermined signal, variable in magnitude in a continuous stepless fashion as a function of the distance the selected floor is in advance of the car, connectable to said source of voltage to control the magnitude of its voltage according to the distance the selected floor is in advance of the car;

a speed responsive signal source responsive to the speed of said car connected to said source of voltage to provide a signal, proportional to the speed of said car, to said source of voltage to control the magnitude of its voltage;

third means, responsive to the car being a predetermined distance from said selected floor for generating a signal to stop;

fourth means, for generating a signal, variable in magnitude in a continuous stepless fashion as a function of time, connectable to said source of voltage and responsive to a starting signal to control the magnitude of the voltage of said source to start the car with an increasing acceleration for an initial period, to accelerate the car with a constant acceleration during a second period and to bring the car to full speed with a decreasing acceleration during a third period;

said fourth means being responsive to the generation of a signal to stop while the car is running at full speed for altering its generated signal in a manner which causes said voltage source to vary the magnitude of its voltage to start to slow the car down with an increasing deceleration;

and switching means connected to said second means and said fourth means and responsive to the magnitudes of the signals of said second and said fourth means for connecting said second means and said fourth means to said source of voltage.

References Cited
UNITED STATES PATENTS

| | | | |
|---|---|---|---|
| 2,629,847 | 2/1953 | Eames et al. | 318—145 X |
| 2,699,226 | 1/1955 | Bruns | 187—29 |
| 2,918,987 | 12/1959 | Haase et al. | 187—29 |
| 3,146,857 | 9/1964 | Bosshard | 187—29 |
| 3,297,110 | 1/1967 | Bagnasco | 187—29 |
| 3,350,612 | 10/1967 | Hansen et al. | 318—143 |

ORIS L. RADER, Primary Examiner

W. E. DUNCANSON, Jr., Assistant Examiner